Figure 1:
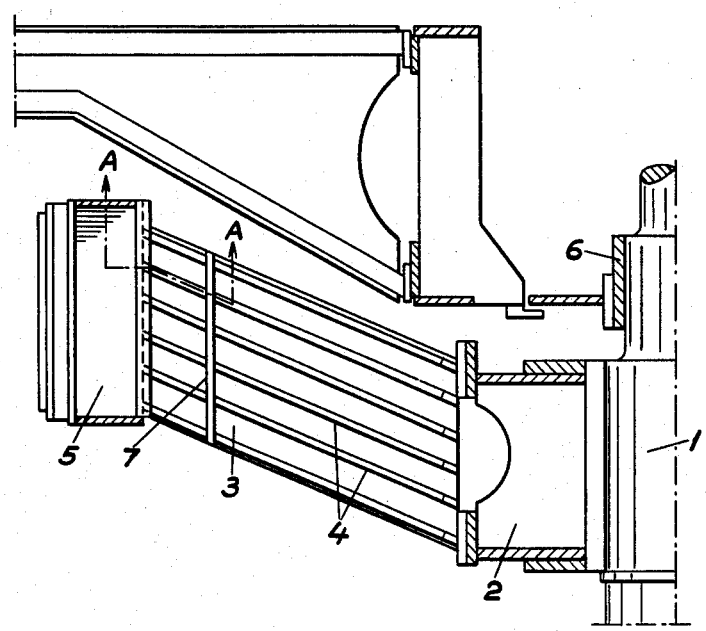

April 7, 1964  S. GYNT  3,128,403

ROTOR SPIDER FOR ELECTRICAL MACHINES

Filed Feb. 29, 1960

A-A

INVENTOR.

SVEN GYNT

BY

*Bailey, Stephens & Huettig*
ATTORNEYS

United States Patent Office 3,128,403
Patented Apr. 7, 1964

3,128,403
ROTOR SPIDER FOR ELECTRICAL MACHINES
Sven Gynt, Vasteras, Sweden, assignor to Allmänna Svenska Elektriska Aktiebolaget, Vasteras, Sweden
Filed Feb. 29, 1960, Ser. No. 11,665
Claims priority, application Sweden Mar. 3, 1959
7 Claims. (Cl. 310—261)

This invention relates to a rotor spider for electrical machines on which spider a ring of magnetic material is mounted in a pre-stressed condition, and where certain stresses on the arms are reduced or eliminated by means of auxiliary elements.

Owing to the turning moment prevailing between the spider and the said ring of magnetic material, and the weight the arms are carrying, the rotor spider arms must have a certain stiffness in the radial direction, and in most rotor constructions it is necessary to have a pre-stressed condition or a force fit between the ring of magnetic material and the arms, this pre-stressed condition being obtained, for example, by shrinking. By this pre-stressing, the arms of the rotor spider are exposed to heavy radial forces which often determine the construction of the arms. This is because if the arms are dimensioned so that they have the elasticity for the pre-stressing, then they will be too weak for bending. If the arms are dimensioned for the moment they shall transmit then they will be too stiff in the radial direction which causes the rotor ring, for example, by shrinking onto the rotor spider, to be too highly stressed and become uncircular, especially if the number of arms is small. To prevent deformation, utilization of a great number of arms in the rotor spider has been tried. This has, however, an additional drawback in that the segments which constitute the rotor ring and which are fixed by means of friction between each other, can then be displaced in the peripheral direction in relation to each other, which increases the diameter of the rotor ring. If the arms of the rotor spider do not extend exactly in the radial direction but in an inclined position in relation to the axis of rotation of the spider, the pre-stressing of the said ring will give a bending moment in the arms and this moment increases with increased inclination of the arms.

The above mentioned drawbacks are avoided by the invention, in which the said ring of magnetic material is mounted on a number of radially extending rods arranged between the said ring and the said boss, the said rods absorbing at least the main part of the compressive stresses generating from the pre-stressing of said ring upon said rods, the arms of the rotor spider thereby taking up the turning moment prevailing between the spider and the ring. The rods which absorb the compressive stresses are movably mounted on the arms of the rotor spider and with their outer ends they engage the ring of magnetic material, and with their inner ends they engage the boss of the rotor spider. If the rods are arranged exactly radially, i.e. the rods extend at right angles to the axis of rotation of the rotor spider, no forces or stresses will be transferred to the arms owing to the pre-stressed condition. If the arms are arranged in an inclined position in relation to the axis of rotation of the spider, the said rods are arranged substantially parallel to said arms and in this arrangement a component of the radial forces will give a certain bending moment on the arms, this moment increasing with the inclination of the rods and also with the increase in stiffness of the rods, but if the said stiffness of the rods is decreased, the bending moment on the spider arms will become insignificant. In using the above mentioned rods the construction of arms of the rotor spider can be dimensioned regardless of the compressive stresses produced by pre-stressing the ring of magnetic material on the rotor spider.

The rods may be guided laterally on the arms of the spider in one way or another so that the possibility of breaking is eliminated. The rods may be given any form of cross-section and the rod ends may be guided in different ways. The rods could be arranged in electrical machines which have horizontal or vertical axes of rotation.

The desired pre-stressed condition between the ring of magnetic material and the rotor spider could be obtained by shrinking but it is also possible to obtain the desired pre-stressed condition by elongating the said rods, for example by dividing each rod into two parts and mounting a common nut on each of the two opposite ends of the rod parts so that by turning the said nut the two rod parts are forced apart, the said rod parts thereby pressing against the boss of the rotor spider and the said ring of magnetic material respectively. It is also possible to use one or more wedges between the rod parts instead of said common nut, and by using rods which are not divided the wedges could be driven in between the rod end and the boss and/or between the rod end and the ring of magnetic material. These common means for elongating the rods or pressing them against the boss or the ring respectively are not shown in the drawings.

The material for the rods could be steel but it would also be advantageous to use, for example, bronze or aluminium or the like, which materials have a lower module of elasticity than steel.

Figure 2:
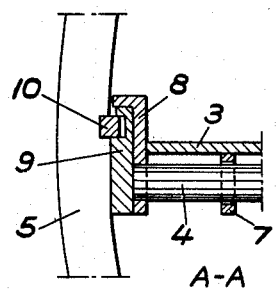

The accompanying drawing shows in a schematical way the principle of the invention in which FIGURE 1 shows a side view in section of half a rotor spider with a ring of magnetic material shrunk onto the rods and FIGURE 2 is a fragmentary sectional view on the line A—A, on a relatively large scale, of FIGURE 1.

In the FIGURES 1 and 2, 1 denotes a rotor shaft on which a spider comprising a boss 2 and radial arms 3 is mounted. 6 denotes an end bearing for the said shaft 1. 4 denotes a number of radially extending rods substantially parallel to the arms 3. In the figures only one arm is shown. These rods 4 absorb the compressive stresses or forces generating from the pre-stressing of a ring 5 of magnetic material onto the outer end of the rods, the said pre-stressing produced, in the embodiment of the invention shown in the figures, by shrinking the rings 5 onto the rods 4, the said shrinking obtained, for example, by heating the ring 5. As shown, the spider arms 3 could be given a certain inclination in relation to the axis of rotation of the spider and the rods 4 are given substantially the same inclination, but it is also possible to give the rods 4 an inclination which differs essentially from the inclination of the arms 3. At their inner ends the rods may be welded to the boss 2 of the spider or fastened in fixed position by other means. To eliminate the possibility of breaking the relatively slender rods 4, one or more guiding beams 7 with apertures for the rods could be attached to the spider arms 3. Preferably a block 9 is arranged between the outer ends of the rods and the ring of magnetic material, the said block, seen in radial direction, having a small air gap between the block itself and an end flange 8 welded to the outer end of a spider arm when the ring 5 is mounted on the rods in a pre-stressed condition. The said flange 8 is given a form which prevents any movement of the block 9 in the peripheral direction. A wedge 10 is mounted in oppositely arranged slots in the ring 5 and the block 9 respectively, to prevent any relative movement in the peripheral direction between the ring and the block.

The embodiment shown in the drawing for a rotor spider according to the invention is only intended to illustrate the principle of the invention, and many different designs are possible with the scope of the invention.

I claim:

1. A rotor for electrical machines comprising a spider and a ring of magnetic material mounted in a pre-stressed condition on said spider, said spider comprising a boss, a plurality of arms secured to and extending outwardly from the boss to said ring and engaging said ring at least in the peripheral direction of the ring, and a plurality of rods also extending between said ring and said boss, said plurality of rods absorbing at least the major part of the compressive stresses resulting from the pre-stressing of said ring upon said spider, the arms of the spider transmitting the turning moment between the boss and the ring.

2. A rotor spider according to claim 1, including means carried by said arms for laterally guiding said rods to eliminate the possibility of breaking.

3. A rotor spider according to claim 1, in which said ring of magnetic material is shrunk on the rods.

4. A rotor spider according to claim 1, in which said rods are elongatable by force.

5. A rotor spider according to claim 1, in which said radial arms have an inclined position with respect to the axis of rotation of the spider, said rods being mounted substantially parallel to the said arms.

6. A rotor spider according to claim 1, in which the said rods extend at right angles to the axis of rotation of the spider and absorb all the compressive stresses resulting from the pre-stressing of said ring upon said rods.

7. A rotor spider according to claim 1, in which said rods are formed of material of a lower modulus of elasticity than steel.

References Cited in the file of this patent

UNITED STATES PATENTS

| | | |
|---|---|---|
| 580,889 | Parcelle | Apr. 20, 1897 |
| 1,423,109 | Hellen | July 18, 1922 |
| 2,016,435 | Isidin | Oct. 8, 1935 |
| 2,499,211 | Chandeysson | Feb. 28, 1950 |

FOREIGN PATENTS

| | | |
|---|---|---|
| 95,323 | Austria | Dec. 27, 1923 |
| 896,388 | Germany | Nov. 12, 1953 |